United States Patent [19]

Schlosser et al.

[11] 4,456,787
[45] Jun. 26, 1984

[54] ELECTROGRAPHIC SYSTEM AND METHOD

[75] Inventors: Philip A. Schlosser; Stanley F. Quayle, both of Columbus, Ohio

[73] Assignee: Scriptel Corporation, Hilliard, Ohio

[21] Appl. No.: 395,261

[22] Filed: Jul. 6, 1982

[51] Int. Cl.³ .......................................... G08C 21/00
[52] U.S. Cl. .................................................. 178/19
[58] Field of Search ........................ 178/19, 18, 87; 324/71.1; 33/1 M; 346/139 C

[56] References Cited

U.S. PATENT DOCUMENTS

| | | | |
|---|---|---|---|
| 2,925,467 | 2/1960 | Becker | 178/18 |
| 3,591,718 | 7/1971 | Ashne et al. | 178/19 |
| 3,632,874 | 6/1972 | Malevard et al. | 178/18 |
| 3,699,439 | 10/1972 | Turner | 324/71.1 |
| 3,798,370 | 3/1974 | Hurst | 178/18 |
| 3,857,022 | 12/1974 | Rebane et al. | 235/151 |
| 3,885,097 | 5/1975 | Pobgee | 178/18 |
| 3,894,183 | 7/1975 | Barish | 178/18 |
| 3,911,215 | 10/1975 | Hurst et al. | 178/18 |
| 3,959,585 | 5/1976 | Mattes et al. | 178/18 |
| 4,055,726 | 10/1977 | Turner et al. | 178/19 |
| 4,071,689 | 1/1978 | Talmage | 178/18 |
| 4,071,691 | 1/1978 | Pepper | 178/19 |
| 4,129,747 | 12/1978 | Pepper | 178/19 |
| 4,198,539 | 4/1980 | Pepper | 178/18 |
| 4,220,815 | 9/1980 | Gibson et al. | 178/18 |

OTHER PUBLICATIONS

Spec. Sheet–Trazor Touch Panel Model 506, Spinal System Instruments Inc.
Spec. Sheet–Touch Screen Digitizer, TSD Display Products Inc.
Spec. Sheet–E270 Transparent Position Sensor, Elographics, Inc.

Primary Examiner—Stafford D. Schreyer
Attorney, Agent, or Firm—Mueller and Smith

[57] ABSTRACT

An electrographic system utilizing a singular resistive layer which may be transparent in conjunction with a supportive substrate. Through the use of an electromagnetic field generating sytlus in conjunction with coordinate alternating border switching, linear output performance is achieved. With the utilization of sum, difference and divider circuitry in conjuction with received output signals, the system remains immune from voltage variations occasioned in conjunction with the stylus and, thus, the stylus may be operated in varying spaced-relationship from the resistive surface.

8 Claims, 10 Drawing Figures

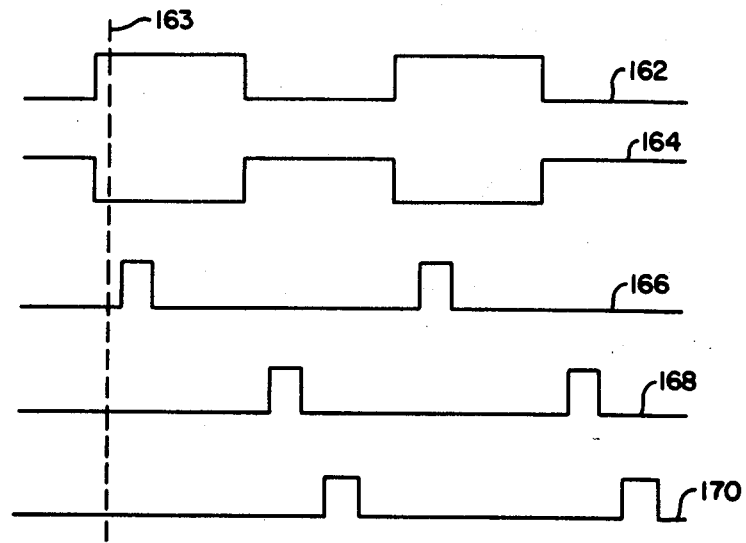
_FIG. 6_
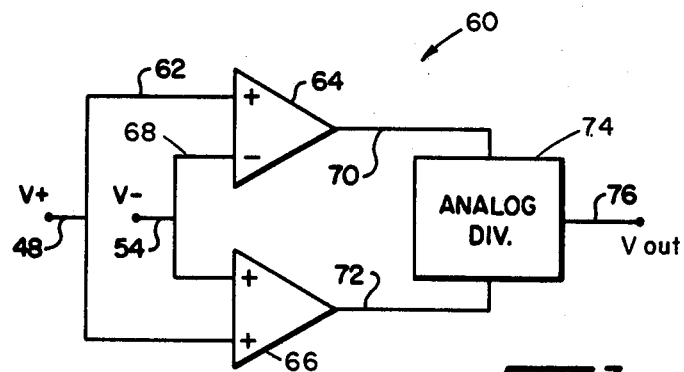
_FIG. 3_

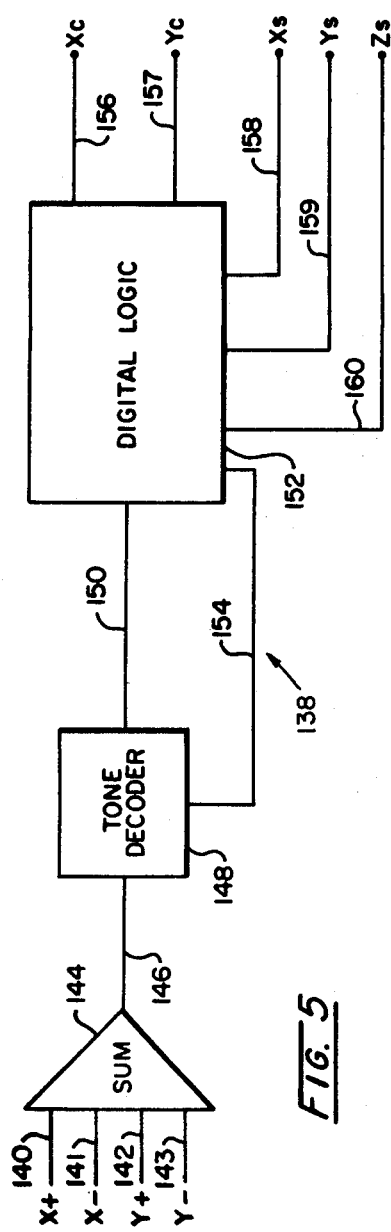
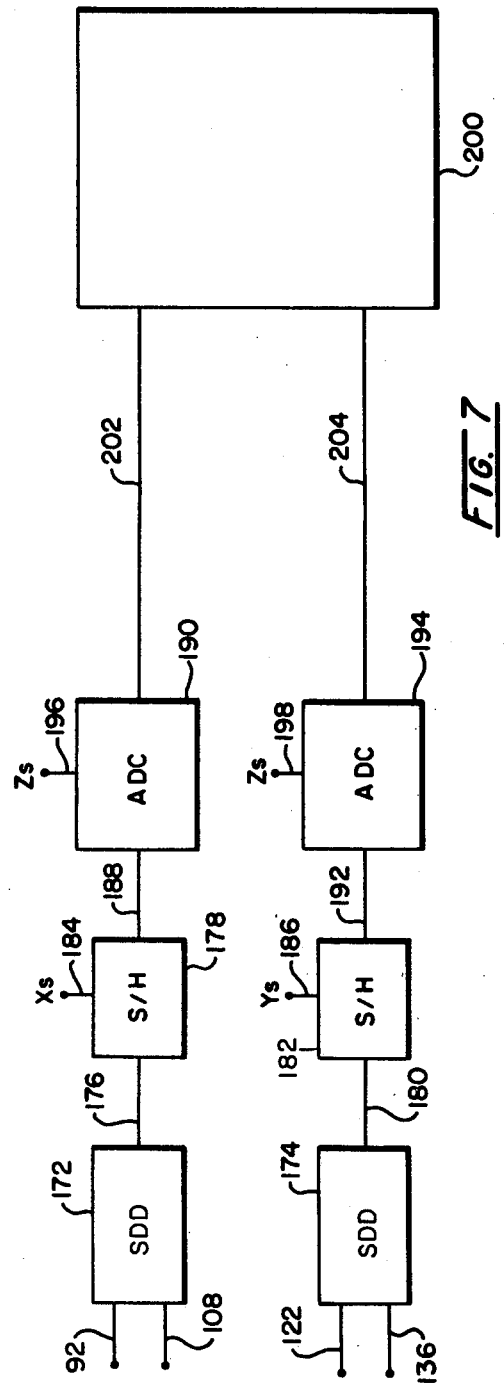

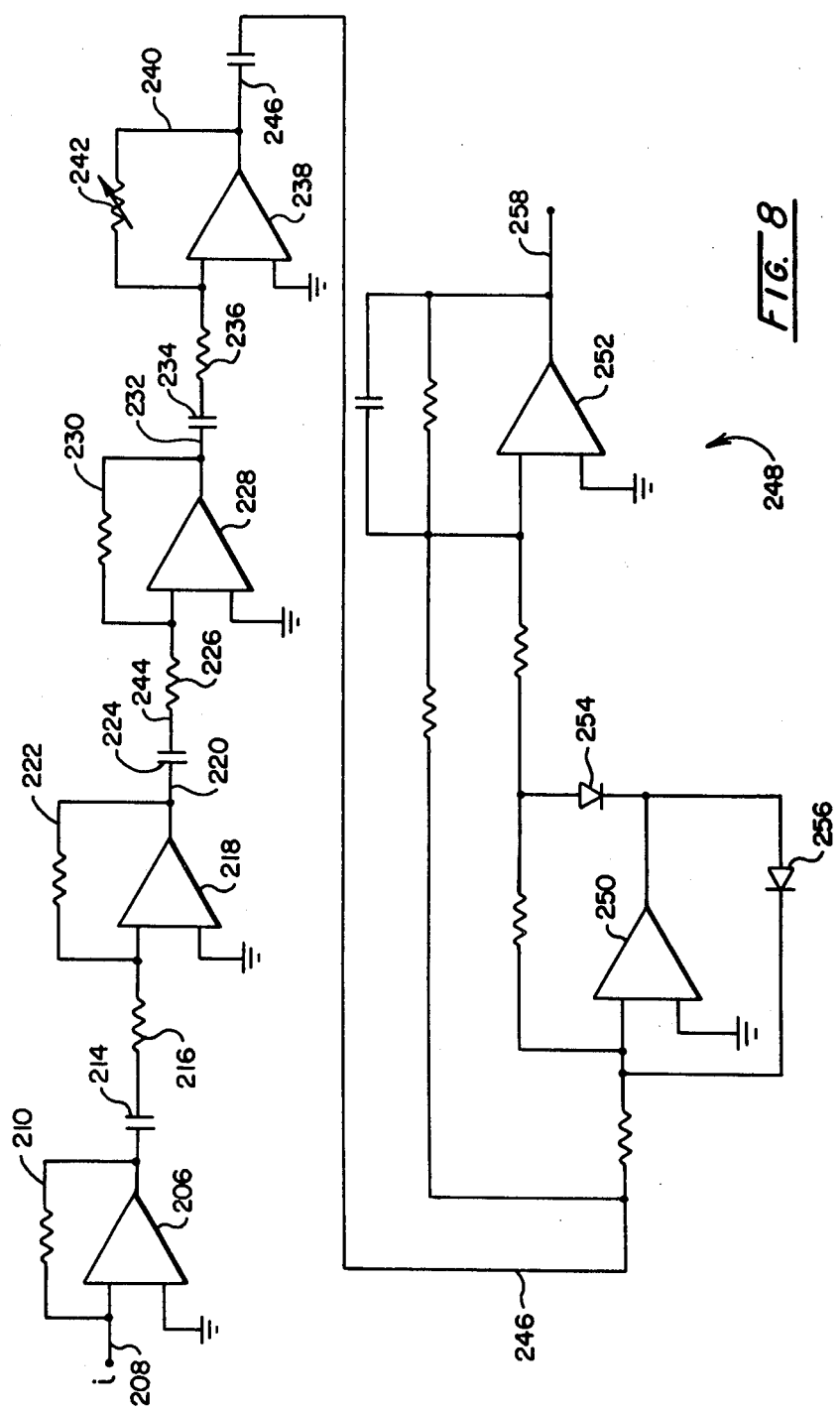

ELECTROGRAPHIC SYSTEM AND METHOD

BACKGROUND

The generation of electrical signals representing graphic data has been a subject of investigation and study for many years. Applications of developments in the fluid of electrographics are quite numerous and promising. For example, graphic data in digital form may be treated by computer in providing graphic design problem analysis. Similarly, digitalized graphic information may be stored in computer memory or transmitted between remote stations via telecommunication links.

The generation of electrographic signal is initiated at a man-machine interface which generally is present as a surface upon which graphic data is manually developed. For the most part, such development occurs in the same fashion as graphics are generated utilizing paper, a stylus representing a writing instrument being drawn across the surface to form informational characters or designs. The surfaces upon which this drawing takes place are commonly known as "digitizers." The digitizers respond to the coordinate position of the stylus held by the operator and generate analog coordinate signals which are appropriately treated and converted to digital form for transmission.

For the most part, digitizers have been fashioned as composite structures wherein a grid formed of two spaced arrays of mutually orthogonally disposed fine wires is embedded in an insulative carrier. One surface of this structure serves to receive a stylus input which is converted to coordinate signals. Various methods have been devised for generating coordinate defining signals as a stylus-grid interaction, for example, a magnetostrictive effect may be established between stylus and grid or a capacitive coupling effect may be evoked between these components.

The use of such grid structures, while providing accurate, linear output coordinate signals necessarily involve intricate structures which are expensive to fabricate and prone to damage in the normal course of use. Further, for many applications it is desirable that the digitizer be fabricated as a highly transparent composite sheet. The grid structures within the composite structures, however, militate against achieving such desired transparency.

Another principal approach in the design of digitizers looks to the use of resistive surface coatings. An immediately apparent advantage of this approach resides in the inherent simplicity of merely providing a resistive surface upon a supportive substrate such as glass or plastic. Further, the resistive coating may be transparent to permit an expanded range of industrial applications.

Unfortunately, designers have encountered a variety of technical problems in adopting the resistive layer to provide coordinate output signals. Paramount among these problems has been the non-linear nature of these coordinate read-outs. A precise one-to-one correspondence is required between actual stylus position and the resultant coordinate signals. However, a pin cushion form of distortion, among others, has been encountered by investigators causing the achievement of linearity of output to become an elusive goal. Various forms of correction have been developed; however, each such correction has been at the expense of losing a desired operational attribute or feature of the digitizer. Among these features desired for the digitizer product is a capability of "writing" with the stylus not touching the surface of the digitizer. Additionally, as indicated above, it is desirable that the digitizer be fabricable as a highly transparent surface. Further, it is most desirable that the digitizer work in conjunction with a sheet of opaque paper such that the operator may draw or make positional visual inputs upon the sheet of paper while, simultaneously, the digitizer provides real time coordinate output signals. Next, the structure of the digitizer must remain simple and immune from the wear and related vagaries encountered in common drafting utilization. In the latter regard, where composite structures requiring separation of resistive surfaces followed by flexure of one into the other are evolved, not only the cost of the digitizer becomes elevated but also the operational life and general reliability thereof become compromised.

SUMMARY

The present invention is addressed to a system and method for generating coordinate signals wherein a simple and readily fabricated single resistive layer is utilized as a digitizer surface in conjunction with a stylus which may be spaced from the surface of such layer. The stylus is configured to generate electromagnetic radiation in a localized fashion. Through the use of spaced edge or border contacts in conjunction with selective switching between edges, highly desirable linearity is achieved. By carrying out appropriate manipulation through sum, difference and divisional operations, the analog outputs representing coordinate position within the system are immune from variations of stylus voltage or surface resistance such that the spacing of the stylus from the sheet as well as its output power may vary without varying the quality of readout. Because of its simple structure, the digitizer may be fabricated in highly transparent fashion; may be used directly in conjunction with drafting paper and the like; and may be applied directly to readout devices such as CRTs.

It is a further object and feature of the invention to provide an electrographic system which includes an electrically insulative substrate over which a resistive layer exhibiting substantially uniform electrical resistance is supported. The resistive layer has an operational region extending in an x-coordinate sense between first and second parallel, spaced-apart border regions and further extends in a y-coordinate sense between third and fourth parallel spaced-apart border regions. A stylus is provided with the system for generating localized electromagnetic radiation which is selectively electrically interactive with the resistive layer at positions which the operator desires. First, discrete, spaced-apart contacts are electrically coupled with the resistive layer at the first border region. Second, discrete, spaced apart contacts are electrically coupled with the resistive layer at the second border region. Third, discrete, spaced apart contacts are electrically coupled with the resistive layer at the third border region, while fourth, discrete spaced-apart contacts are electrically coupled with the resistive layer at the fourth border region. A signal treating arrangement which is selectively responsive to electrial signals generated by the stylus interaction and present at the first and second contacts serves to derive x-coordinate signals corresponding with the x-coordinate location of the interaction created by the stylus and is selectively responsive to the electrical signals present at the third and fourth contacts to derive y-coordinate signals corresponding with the y-coordinate location of the interaction. A switching system is provided for coupling the first and second contacts in signal transferring relationship with the signal treating arrangement while effecting a mutual, open circuit isolation of the third and fourth contacts and which serves further for coupling the third and fourth contacts in signal transferring relationship with the signal treating means while effecting a mutual, open circuit isolation of the first and second contacts.

As another object of the invention, a system is provided wherein the signal treating arrangement includes a current to voltage converter for receiving the electrical signals generated from the interaction of the stylus with the resistive layer and which has an alternating voltage output corresponding therewith. The signal treating arrangement further includes a converter for converting the alternating voltage output to a constant voltage output.

As another object and feature, the signal treating arrangement may include a normalizing circuit which is responsive to the constant voltage outputs thereof corresponding with each of the first and second border regions for deriving an output voltage corresponding with the ratio of the difference of the contact voltage outputs divided by the sum thereof.

As another feature and object of the invention, the signal treating arrangement further comprises a normalizing circuit which is responsive to the constant voltage outputs corresponding with each of the third and fourth border regions for deriving an output voltage corresponding with the ratio of the difference of the constant voltage outputs divided by the sum thereof.

Another object of the invention is to provide a method for generating coordinate signals in conjunction with a surface which comprises the steps of providing resistive surface having an operational region extending in an x-coordinate sense between first and second spaced-apart border regions and extending in a y-coordinate sense between third and fourth spaced-apart border regions. A localized electromagnetic radiation is transmitted to a select coordinate identifiable location upon the resistive surface while simultaneously the first and second border regions are retained near ground potential and the third and fourth border regions are retained in an electrically isolated condition. The method further includes the step of receiving the charge coupled currents at the first and second border regions and converting these currents to x-coordinate signals.

As another object, the method of the invention includes the step of transmitting localized electromagnetic radiation of predetermined frequency to a select coordinate identifiable location upon the resistive surface while simultaneously retaining the third and fourth border regions near ground potential and retaining the first and second border regions in an electrically isolated condition in conjunction with the steps of receiving radiation induced currents at the third and fourth border regions and converting these currents to y-coordinate signals.

Other objects of the invention will, in part, be obvious and will, in part, appear hereinafter.

The invention, accordingly, comprises the apparatus, method and system possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 3 is a schematic circuit diagram of a sum, difference and divider circuit utilized with the instant system;

FIG. 5 is a schematic diagram of control logic circuitry utilized with the system of the invention;

FIG. 6 is a series of aligned timing diagrams describing the control outputs of the circuit of FIG. 5;

FIG. 7 is a schematic block diagram of a signal treating circuit which may be utilized with the system of the invention;

FIG. 8 is a circuit diagram showing amplification and A.C.-D.C. converter stages utilized with the system of the invention;

DETAILED DESCRIPTION

Figure 1:
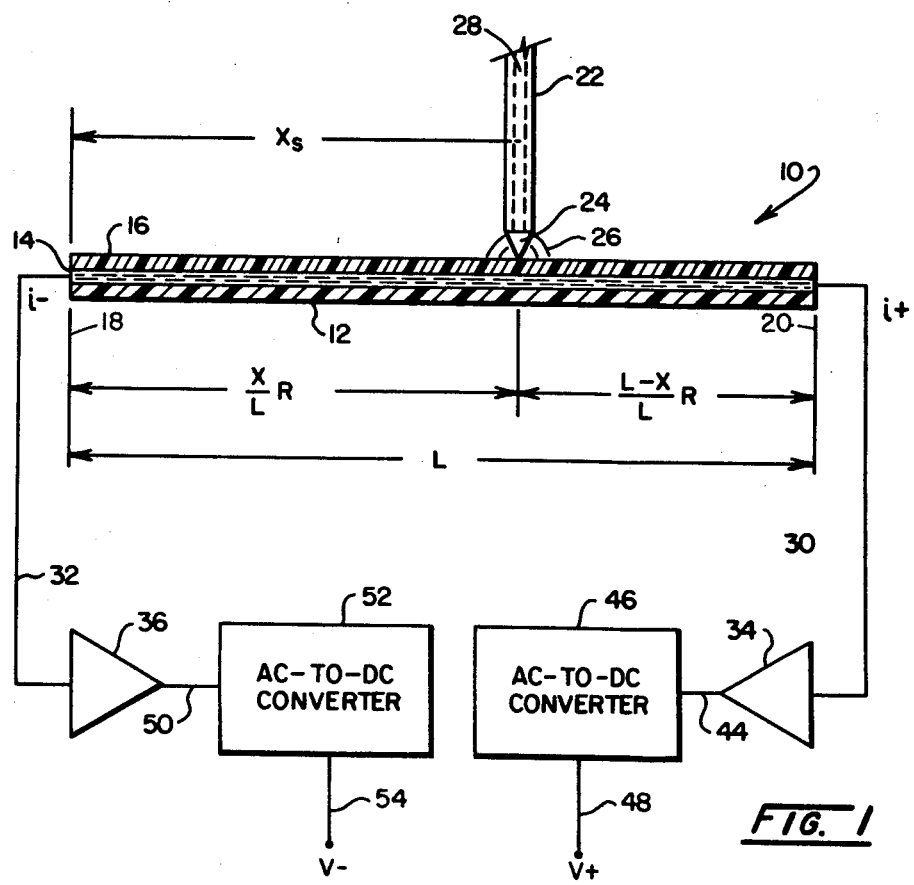
FIG. 1 is a schematic representation of a one-dimensional model of the electrographic system of the invention.

The advantageously simplicity of the electrographic system of the invention is achieved, inter alia, in consequence of an inherent linearity stemming from its design. As a prelude to considering the overall structure of the apparatus forming the system of the invention, reference initially is made to a one-dimensional model thereof as represented in FIG. 1. Referring to that figure, the one-dimensional model is shown to comprise a sectional view of a digitizer 10 formed of an electrically insulative substrate 12 over which is positioned a resistive layer 14. The upwardly disposed surface of resistive layer 14 is protected by an electrically insulative layer 16. In a preferred embodiment, substrate 12 and layer 14 are transparent and may be present as a rigid support formed of glass or the like or, alternately, may be provided as a flexible transparent plastic such as Mylar. Resistive layer 14 in the preferred embodiment of the invention has a highly uniform sheet resistance selected in a value range of about 100 to 10,000 ohms per square. For improved versatility of application, the layer 14 preferably is transparent and, thus, may be formed of an indium tin oxide or other suitable semiconducting metal oxide incorporating metals from the group tantalum, indium, tin, antimony, or mixtures thereof. For the one-dimensional aspect shown, layer 14 has a length, L, extending from boundary line 18 to boundary line 20. Located above the protective insulative layer 16 is a stylus 22 which may be provided having a point region 24 formed of metal and which may serve a conventional writing function and for this purpose be present as a ballpoint pen. Stylus 22, in effect, serves as a transmitter of low power electro-magnetic radiation which is represented by field lines 26. Generally, the stylus 22 emits an A.C. signal selected in the range of about 100 KHz to 1 MHz and incorporates a shielded rod shown in phantom at 28 which is excited with an A.C. current and extends in the unshielded point portion 24. Excitation of the stylus 22 may be provided through connection with an A.C. voltage source or, alternately, the stylus may be entirely self-contained having a battery power supply along with a simple oscillator circuit. The range of frequency noted above is selected principally with respect to the most practical amplifiers utilized ultimately to treat the resultant signals of the system. As is apparent, direct contact between the point 24 of stylus 22 and sensitive layer 14 is not required for the system to perform, in fact, the system works well through paper or essentially any insulative medium which will not block the radiated field signal. The radiative output 26 of stylus 22 is in the microwatt range and couples with or electrically interacts with resistive layer 14 to provide mirror charges, the electric field thereof forming free charges within layer 14. To provide this, ground levels are developed at oppositely disposed connections with layer 14 at respective borders 20 and 18. In order to achieve desired edge grounding at couplings 30 and 32, operational amplifiers shown respectively at 34 and 36 may be employed, the initial input stages thereof representing a virtual earth input such that the connections 30 and 32 will remain very near to ground level or at least within microvolts thereof.

Figure 2:
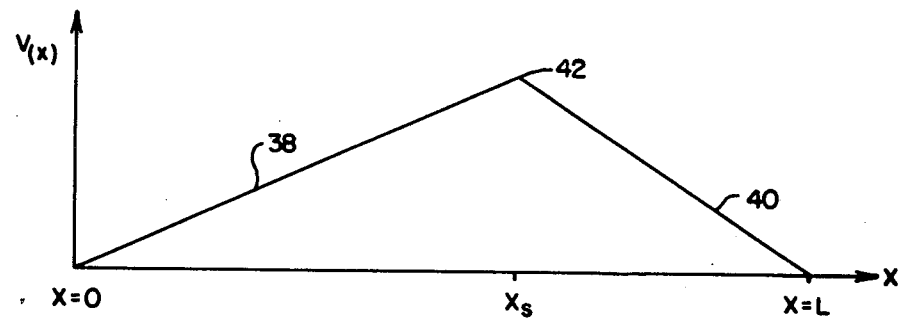
FIG. 2 is a schematic curve showing voltage distribution across the resitive sheet represented in FIG. 1.

Inasmuch as a largest voltage at layer 14 is derived at the charge coupling of field 26 and the ends of resistive layer 14 at connections 30 and 32 for the instant one-dimensional model are at ground as a boundary condition, a current must flow and this current is utilized to develop a one-dimensional or "x" position of stylus 22 as a distance from border 18. In view of Ohms Law, the voltage distribution from stylus 22 along the x dimension is linear and this linearity is schematically represented in FIG. 2 at voltage profiles 38 and 40. Looking additionally to that figure, the profiles 38 and 40 are shown to lead to an apex 42 aligned with the center line of stylus 22. Apex 42 represents the position of highest voltage at layer 14 and the linear distribution of voltages extending from apex 42 as represented by profile 38 leads to the position x=0 or zero voltage and along profile 40 to the value x=L, again representing a zero voltage boundary limit at distance L from boundary 18.

Returning to FIG. 1, it may be observed that the fraction of resistance exhibited to the charge splitting activity at field 28 extending from boundary 18 to stylus 22 may be expressed as:

$$\text{resistance} = (x/L)R \quad (1)$$

where R is sheet resistance of layer 14. The corresponding fraction of resistance extending from stylus 22 to boundary 20 may be represented by the expression:

$$\text{resistance} = \frac{L-x}{L} R. \quad (2)$$

The current occasioned by charge splitting at the localized charge coupling point of stylus 22 migrates toward ground level couplings 30 and 32 to provide A.C. currents labeled respectively $i+$ and $i-$.

Utilizing expressions (1) and (2) above, and assuming a stylus voltage as $V_s$, the value of currents $i+$ and $i-$ may be expressed as follows:

$$i+ = \frac{V_s}{\left(\frac{L-x}{L}\right)R} \quad (3)$$

$$i- = \frac{V_s}{\left(\frac{x}{L}R\right)} \quad (4)$$

Coupling 30 is connected with the input of operational amplifier 34 which serves as a current to voltage converter. When the input impedance of operational amplifier 34 is negligible with respect to the sheet resistance, the edge at 30 is essentially at ground potential. Correspondingly, coupling 32 is connected to the input of operational amplifier 36 which serves to convert the current designated $i-$ to an A.C. voltage. The output of amplifier 34 at line 44 is introduced to an A.C. to D.C. converter 46 which serves to convert the A.C. signal to a D.C. level at line 48 which is labeled V+.

In similar fashion, the output of amplifier 36 is present at line 50 which, in turn, is coupled to an A.C. to D.C. converter 52 having an output at line 54. As before, the D.C. voltage is labeled, V−.

Looking additionally to FIG. 3, a schematic representation of a sum, difference and divider circuit is shown generally at 60. Circuit 60 is utilized to derive a predetermined relationship of the voltage V+ at line 48 and V− at line 54. These lines again are reproduced in FIG. 3, line 48 being shown coupled through line 62 to the positive inputs of difference and summing networks shown respectively at 64 and 66. Correspondingly, the voltage V− at line 54 is shown being introduced through line 68 to the opposite input of networks 64 and 66. With this arrangement, the output of network 64 at line 70 may be represented as (V+ − V−), while the output of network 66 at line 72 may be represented as (V+ + V−). The signals at lines 70 and 72 are, in turn, directed, to the inputs of an analog divider network 74 having an output at line 76 labeled $V_{out}$. With this straightforward treatment, the resultant voltage $V_{out}$ is represented as the difference/sum ratio:

$$V_{out} = (V+ - V-)/(V+ + V-). \quad (5)$$

Utilizing the earlier discussed current equations (3) and (4) based upon the sheet resistance R and the voltage of the stylus, $V_s$, and applying those current equations to the difference/sum ratio, and utilizing straightforward algebraic relationships, the value of the ratio becomes:

$$V_{out} = (2x/L) - 1. \quad (6)$$

Thus, the difference/sum voltage ratio is normalized in character and through the utilization of a signal as derived as $V_{out}$ at line 76, the system of the invention becomes entirely independent of the voltage, $V_s$, generated through coupling by stylus 22 and additionally independent of the sheet resistance, R, evolved at layer 14. As stylus 22 is moved away from the surface layer 14, the system functions to derive the position of the centroid of the propagated electromagnetic flux. Thus, with the provision of symmetrically transmitted stylus position signals, the independence of stylus 22 spacing is ensured within reasonable limits. These normalized signals, being independent of the coupling voltage generated by stylus 22, not only permit the utilization of the stylus in conjunction with layer 14 at varying distances therefrom, but also through documents of an insulative nature such as books, memo pads, sales booklets and the like. In actual practice, the stylus has been utilized through a one-inch wood board.

Also to be recognized from the arrangement thus described, an independence to sheet resitance of the system permits manufacture with more relaxed tolerances. Further, for the one-dimensional arrangement shown, the output voltage generated by stylus 22, for example, as it moves from the one border 18 to the other at 20 is totally linear. For example, for the equation (6) shown above, when the distance x is 0, $V_{out}$ is equal to $-1$ volts, when distance x is 0.5 L, $V_{out}$ is 0 volts; and when x is equal to the distance L, $V_{out}$ becomes $+1$ volt.

It may be recalled that the foregoing discussion is concerned with a one-dimensional model. In accordance with the instant invention, the advantageous normalized output signals independent of stylus 22 voltage as well as sheet resistance, R, are effectively incorporated within a two-dimensional, x,y electrographic system.

Figure 4:
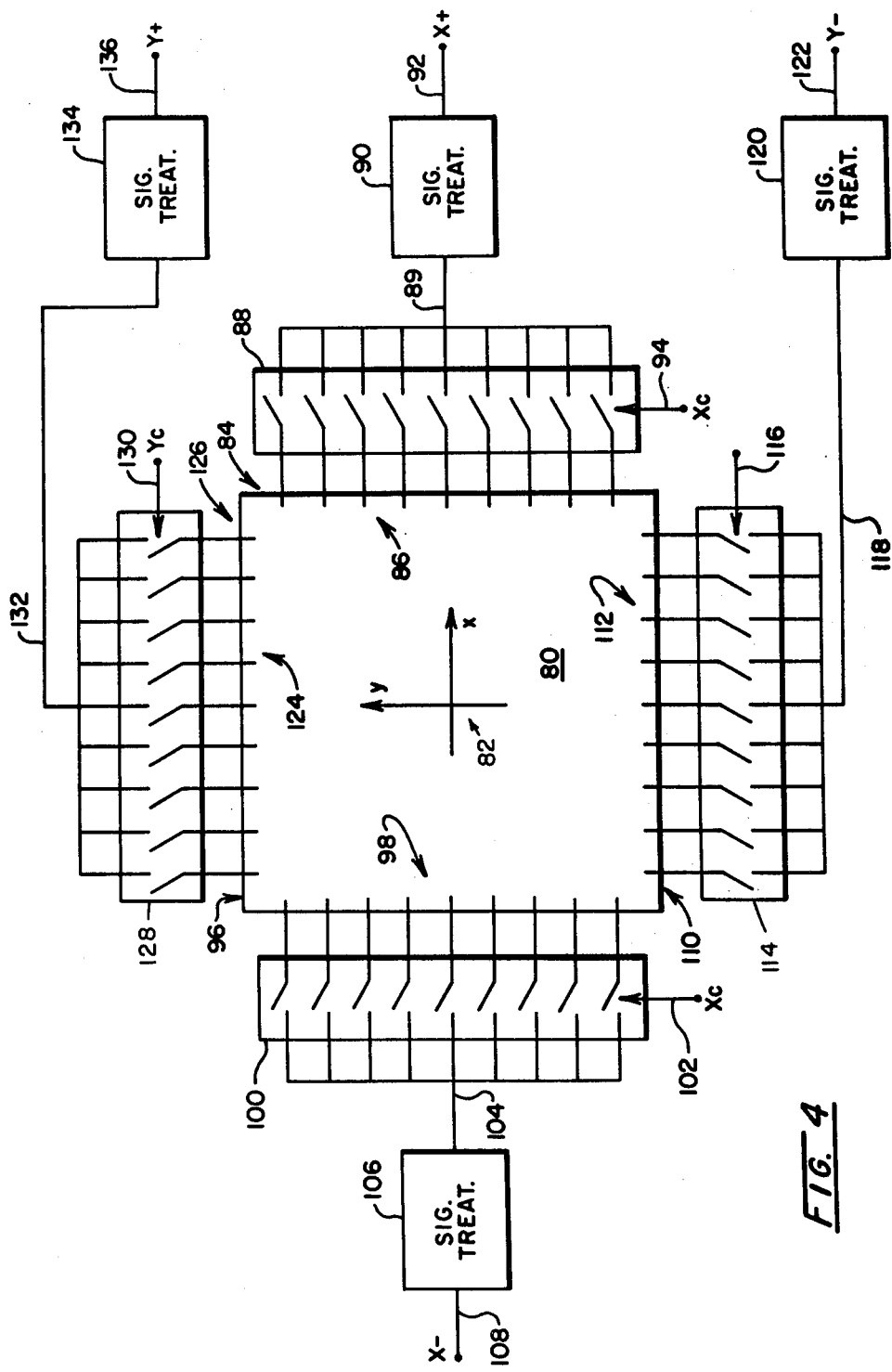
FIG. 4 is a schematic plan view of a digitizer configured according to the invention.

Referring to FIG. 4, the development of a digitizer incorporating the operational aspects of the one-dimensional embodiment is a two-dimensional theme is shown. The digitizer resistive surface is represented by the square surface represented generally at 80. Surface 80 may have a cross section identical to that described at 10 in conjunction with the one-dimensional model. The digitizer surface 80 may be considered to operate in conjunction with designated x and y coordinate pairs as represented generally at 82. Thus, in a positive x coordinate sense, the border region 84 of surface 80 is shown to be electrically associated with an array of discrete spaced apart contacts represented generally at 86 which are electrically coupled in spot fashion with the resistive layer 80. Each of the contacts within the array 86 is coupled with one discrete switch within an analog switch array depicted at 88. The outboard terminals of all switches within the array 88 are coupled in common with line 89 which, in turn, is directed into a signal treatment network which may include current to voltage conversion, amplification, and A.C. to D.C. conversion and is represented generally by block 90. A necessary condition for linear operation is that the "on" resistance of the switches and the input impedance of block 90 be negligible as compared to the impedance of the resistive layer. The output of block 90 at line 92 is identified as carrying a D.C. analog output represented as $X+$. Switch array 88 is actuated by a control signal $X_c$ as represented at line 94. Control signal $X_c$ serves to simultaneously open or close all switches within the array 88.

In identical fashion, the $-x$ coordinate border of surface 80 is represented at border region 86 which, as before, includes an array of discrete, spaced apart contacts 98, each of which is electrically coupled with the resistive layer of surface 80. Each of the contacts at array 98, in turn, is coupled with one side of a corresponding array of discrete analog switches within analog switch array 100. Simultaneously controlled by the above-noted control signal $X_c$ through line 102, the common outputs of the switches within array 100 are collected in common at line 104 for submission to a signal treatment network 106 structured identically with that identified at block 90. The output of network 106 is present at line 108 and is represented as carrying a signal designated $X-$.

The y coordinate structuring of the digitizer is similarly identically fashioned, the border region 110 of the $-y$ coordinate being electrically coupled with an array of discrete spaced apart contacts 112, each of which extends to one side of a discrete switch within an analog switching array represented within block 114. Under the control of a y coordinate control signal identified as $Y_c$ at line 116, the switch array selectively transfers signals received from contact array 112 through common line connection 118 to a signal treating network 120. Network 120, having an output labeled $Y-$ at line 122, is structured identically as that described in conjunction with block 90.

In similar fashion, an array of spaced apart, discrete contacts 124 are electrically coupled to the resistive surface 80 within positive y coordinate border region 126. Each of the discrete contacts within array 124 is, in turn, coupled with a discrete switching component within analog switching array 128. The switches within array 128 are simultaneously actuated between open and closed conditions by a control signal input, $Y_c$, represented at line 130 and the switches have a common output at line 132 which is directed to a signal treating network 134 functioning and structured in identical fashion as that described at 90. The output of network 134 is identified as $Y+$ and is presented at line 136.

Utilizing the control signals $X_c$ and $Y_c$ in alternating fashion, the $X-$ and $X+$ signals at respective lines 108 and 92 are submitted to a sum, difference and divider circuit as has been described earlier in conjunction with FIG. 3. When control signal $Y_c$ is utilized to close the switches within arrays 128 and 114, the corresponding switches within arrays 88 and 100 are opened and the signals $Y-$ and $Y+$ at respective line 122 and 136 are submitted to a sum, difference and divider circuit in similar fashion. As a consequence, the normalized coordinate stylus positions x,y may be represented as follows:

$$x = (X+ - X-)/(X+ + X-) \qquad (7)$$

$$y = (Y+ - Y-)/(Y+ + Y-) \qquad (8)$$

With the arrangement shown, it may be observed that during the interval when y-coordinate signals are being developed through switch arrays 114 and 128, the x-coordinate switches within arrays 88 and 100 are open. Thus, the edges or borders 84 and 96 electrically "float" and are electrically isolated to the extent that the system operates as if it were a one-dimensional device. Correspondingly, when x-coordinate data is developed, the switches within switch arrays 88 and 100 are closed, while the corresponding y-coordinate switches within arrays 114 and 128 are opened. In this operational mode, the border regions, 126 and 110 "float" electrically and, again, the surface 80 is operational in the manner described in conjunction with a one-dimensional model.

The number of contact points made within each border region may be varied somewhat, economic considerations looking to the number of switches required. Generally, linearity has been observed to fall within acceptable limits where 8 to 12 contacts spaced at about one inch distances are provided within each array. Any lag time experienced within the system in switching between the x and y coordinate performance is dismissable, the dielectric relaxation interval of the resistive surface at 80 generally being in the region of $10^{-12}$ seconds.

Referring to FIG. 5, a network suited for deriving the above-described control signals is schematically revealed in general at 138. As an initial aspect of the control legs, it is desirable to determine whether or not a stylus 22 is in use and this information is derived by monitoring the alternating voltage of initial amplification stages. Inasmuch as the coordinate information is derived alternately in an x and y sense, four such signals, two corresponding with an x coordinate and two corresponding with a y coordinate are monitored by line taps as represented at lines 140–143. The alternating signals are directed to a sum network 144, the output of which is provided at line 146. Line 146, carrying the pen frequency alternating signal, is directed to the input of a tone decoder represented at block 148. Decoder 148 may, for example, include phase lock loop networks or the like to provide for rejection of spurious RF signals and the like and to provide an enabling digital logic output signal at line 150. Line 150 is directed to the input of a conventional dividing digital logic circuit represented at block 152.

Logic network 152 provides a series of control signal outputs as represented at lines 156–160. Lines 156 and 157 carry the earlier discussed switching control signals $X_c$ and $Y_c$, while lines 158–160 carry synchronization signals labeled respectively $X_s$, $Y_s$ and $Z_s$.

Looking to FIG. 6, a timing diagram showing the latter signals is provided. Generally, it is desirable to provide a coordinate pair switching at a rate of about 100 pairs per second, thus the control logic is designed in accordance with the frequency aspects of stylus 22. It may be noted that the $X_c$ timing diagram 162 is complementary to the corresponding switching control signal $Y_c$ as represented at 164. Thus when the signal represented at 162 is "on", the corresponding signal at 164 is "off."

The remaining timing diagrams at 166, 168, and 170 correspond, respectively, with the signals at lines 158–160 and are utilized in the development, for example, of a computer compatible signal.

The tone decoder 148 provides an oscillating digital signal on line 154 which is matched in the stylus 22 frequency. Lines 150 and 154 are provided to a control signal generator at block 152. When the input on line 150 is in a disabled state, the control outputs are in the state shown by vertical time line 163. When the input on line 150 is in the enabled state, the control signal outputs proceed through the series of states shown in FIG. 6. This circuit usually is implemented using counters and demultiplexers.

Referring to FIG. 7, the D.C. signals derived as described in conjunction with FIG. 6 at lines 92 and 108 representing x-coordinate data are directed to a sum, difference and divider circuit represented at block 172 and described earlier in conjunction with FIG. 3. Similarly, y-coordinate information as developed at lines 132 and 136 is directed to an identical circuit represented at block 174. The resultant normalized direct current signal developed by network 172 is provided at line 176 which is directed to the input of a sample and hold network represented by block 178. In similar fashion, the normalized D.C. signal of network 174 is provided along line 180 to the input of a second sample and hold circuit represented by block 182. Network 178 is activated from line 184 which carries a clocking signal $X_s$ as developed by logic network 152 at line 158 and represented by timing diagram 166. This signal occurs during the on status of control signal $X_c$ as represented at timing diagram 162. Similarly, sample and hold network 182 is controlled from line 186 which carries the clocking signal designated $Y_s$ represented in FIG. 6 at timing diagram 168. Note, that the pulse signal of diagram 168 occurs during the on status of switching control signal $Y_c$ as represented at diagram 164.

The output of network 178 is provided at line 188 and is directed to the input of an analog to digital converter network 190. In similar fashion, the output of sample and hold network 182 is directed along line 192 to the input of an analog to digital converter represented at block 194. Converter network 190 is enabled by a signal labeled $Z_s$ applied at line 196, while network 194 is enabled by the same signal as applied through line 198. Signal $Z_s$ is represented at timing diagram 170 and provides an actuating pulse once per cycle. This same pulse may be utilized as a prompt signal in conjunction with the presentation of digital information to a computer or the like. In the latter regard, such as ultimate utilization is represented at block 200 which receives parallel or serial digital data from network 190 through connection 202 and similar information from network 194 through connection 204.

Referring to FIG. 8, an exemplary implementation of the amplification and A.C. to D.C. conversion function described, for example, at 34 and 46 in FIG. 1 is revealed. Current developed from resistive sheet or layer 14 is directed into the inverting input of an operational amplifier 206 via line 208. Line 203 is held at ground level by internal circuitry of the amplifier 206 to provide the necessary ground levels for operation of the digitizer. Amplifier 206 is a current to voltage converter incorporating a feedback path at line 210 extending from its output at line 212. Output line 212 extends through A.C. coupling capacitor 214 and input resistor 216 to the input of a voltage amplifier 218. Amplifier 218 provides an output at line 220 and includes a feedback path 222. The output of amplifier 218 and line 220 is coupled through coupling capacitor 224 and input resistor 226 to the input of a next voltage amplification stage 228. Amplifier 228 includes a feedback path 230 extending from its output at line 232 to its input. The output of amplifier 228 at line 232 is coupled through capacitor 234 and input resistor 236 to the corresponding input of amplifier 238. For calibration purposes, amplifier 238 includes a feedback line 240 incorporating a variable resistor 242. It may be observed that the output line 220 has a tap for providing A.C. signals utilized as at lines 140–143 described in conjunction with FIG. 5.

The output of amplifier 238 at line 246 is directed to an A.C. to D.C. converter network represented generally at 248. Network 248 is a precision rectifier formed of two operational amplifiers 250 and 252 operating in the configuration shown in conjunction with directional conducting components provided as diodes 254 and 256 and having a D.C. output at line 258.

Figure 9:
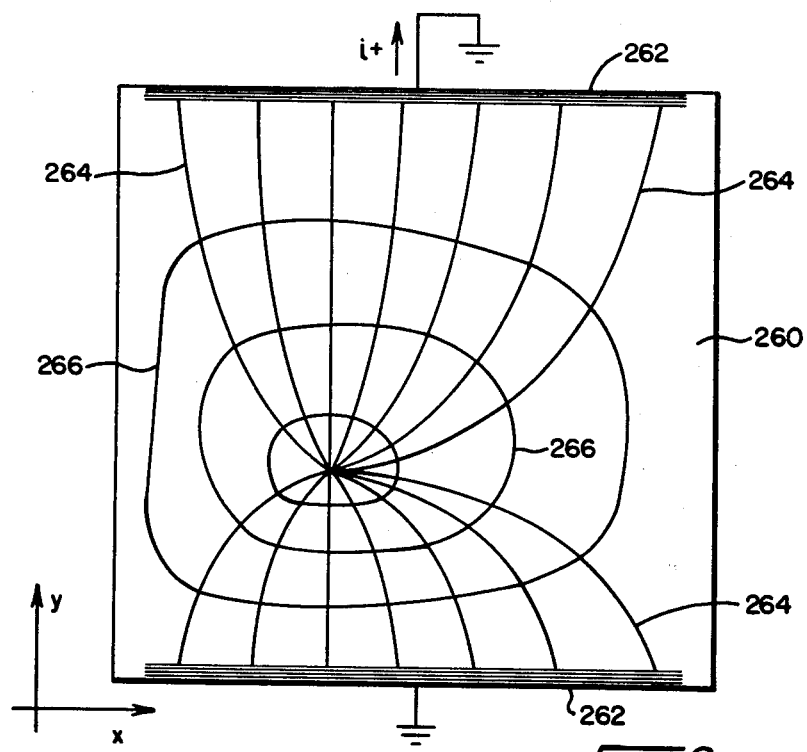
FIG. 9 is a schematic representation of electric field and equipotential lines utilized in describing the theory of the invention.
Figure 10:
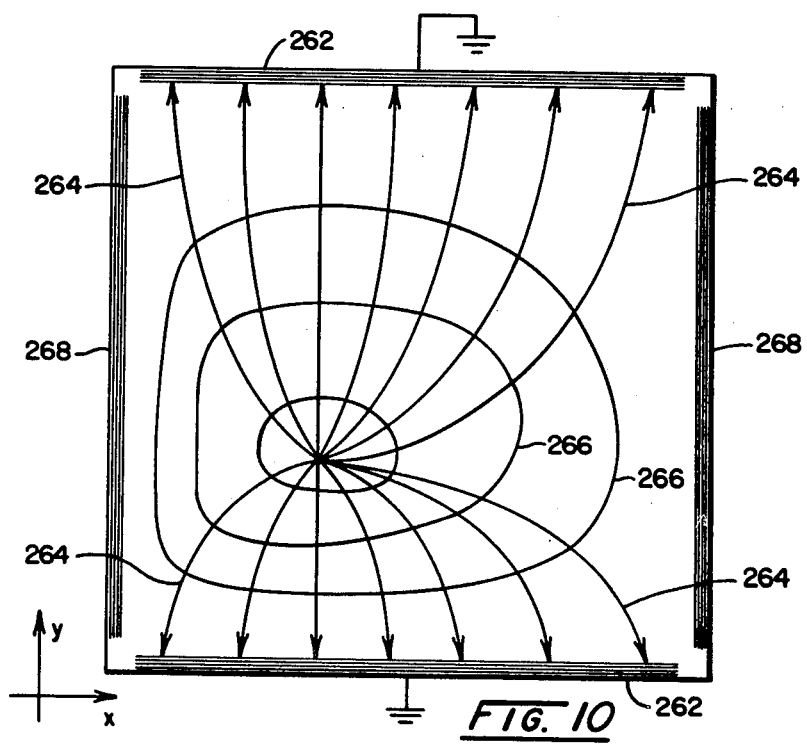
FIG. 10 is a schematic representation of electric field and equipotential lines utilized in describing the theory of the invention.

The theoretical basis for the system of the invention can be illustrated by considering FIGS. 9 and 10. FIG. 9 shows the structure of the electric field lines, E(x,y), and the equipotential curves, V(x,y)=constant, on a uniform resistive sheet 260 having a resistance value of R ohms per square. Note that the geometry of sheet 260 of FIG. 9 illustrates one-dimensional readout of the stylus position on the y-axis and represents the condition of the digitizer surface when all x-coordinate switches are open and all y-coordinate switches are closed. Conductive electrodes are represented at 262.

The electric field structure of FIG. 9 can be calculated by solving Laplace's Equation, $$\nabla^2 V(x,y) = 0, \tag{9}$$

where $V(x,y)$ is the electric potential at any location $(x,y)$ in the plate of the resistive layer, and $\nabla^2$ is the Laplacian operator given by $$\nabla^2 = \frac{\partial^2}{\partial x^2} + \frac{\partial^2}{\partial y^2}. \tag{10}$$

The set of curves 266 specified by $$V(x,y) = \text{constant} \tag{11}$$

are known as equipotential curves. The electric field lines are calculated from the equation:

$$\vec{E}(x,y) = -\vec{\nabla} V(x,y), \tag{12}$$

where $\vec{\nabla}$ is the usual gradient operator, and $\vec{E}(x,y)$ is the electric field vector (specified by its magnitude and direction) at any point $(x,y)$ in the plane (see lines 264).

Equations (9) and (10) are well known to and can be solved by anyone who is skilled in electromagnetic theory. Equation (9) is a second-order, partial differential equation, solvable by analytical or numerical (computer) methods, subject to appropriate boundary conditions. The boundary conditions are always unique to the geometry to which the equation and its solution are applied.

In the case of FIG. 9, the appropriate boundary conditions are:

(1) The electric potential at the upper and lower conductive electrodes (which are grounded) is zero.

(2) The potential at $(X_o, Y_o)$, the stylus position, is equal to $V_s$, which is the A.C. voltage induced on the resistive layer immediately below the point of the stylus.

The solutions of Equations (9) and (12) subject to the above boundary conditions yield the family of curves illustrated in FIG. 9. Note that the equipotential curves 266 always have voltage between $V_s$ and ground, with the curves closest to $V_s$ having higher potentials and, as they approach the edges of the surface, the potential decreases to 0. Note also that this arrangement gives rise to currents $i_+$ and $i_-$, which in the one-dimensional case are linearly related to the scroll position in the y-direction.

Now examine FIG. 10 which shows the same geometry with the exception of the addition of conductive electrodes 268 on the left and right eges of the resitive surface. In this configuration the left and right conductive electrodes are allowed to "float" electrically, which is exactly the condition when all x-switches are open. It can be shown by solving Equations (9) and (12) subject to the boundary conditions inherent in FIG. 10, that the electric yield structure and equipotential curves are unaffected by the presence of the "floating" electrodes on the right and left sides. It further can be shown that the left and right conductive electrodes "float" at ground potential. This concept is key to the basic accuracy, linearity and function of the instant system. It means, in more practical terms, that two-dimensional resitive sheet digitizers (which heretofore have been markedly non-linear with previous readout geometrices) can be read out with one-dimensional, inherently linear, accuracy by switching geometry described herein.

Note further that FIG. 10 shows only the condition of the device while the y-coordinate position of the stylus is determined. In order to determine the x-coordinate position of the pen it only is necessary to open the y-coordinate switches and simultaneously close the x-coordinate switches, measuring currents which flow into the left and right conductive electrodes, and thereby obtaining one complete coordinate pair for the stylus position. The act of switching alternatively back and forth between x and y coordinate configurations preserves the inherent linearity of both x and y coordinate information obtained in this manner.

Since certain changes may be made in the above-described system, method and apparatus without departing from the scope of the invention herein involved, it is intended that all matter contained in the description thereof or shown in the accompanying drawings shall be interpreted as illustrative and not in a limiting sense.

We claim:

1. An electrographic system comprising:
an electrically insulative substrate;
a resistive layer exhibiting substantially uniform electrical resistance supported upon said insulative substrate and having an operational region extending in an x-coordinate sense between first and second parallel, spaced apart border regions, and extending in a y-coordinate sense between third and fourth parallel, spaced-apart border regions;
stylus means for generating localized electromagnetic radiation from an a.c. source to effect the propagation thereof toward said resistive layer from positions selectively spaced therefrom to effect interaction therewith;
first, discrete, spaced-apart contacts electrically coupled with said resistive layer at said first border region;
second, discrete, spaced-apart contacts electrically coupled with said resistive layer at said second border region;
third, discrete, spaced apart contacts electrically coupled with said resistive layer at said third border region;
fourth discrete, spaced-apart contacts electrically coupled with said resistive layer at said fourth border region;
signal treating means including voltage converter means having an input for receiving electrical signals generated by said stylus means interaction and conveyed thereto for providing an alternating voltage output corresponding therewith, means responsive to said alternating voltage output to derive a constant voltage output corresponding therewith and means responsive to said constant voltage outputs corresponding with electrical signals at said first and second border regions for deriving x-coordinate signals corresponding with the ratio of the difference of said constant voltage outputs corresponding with said first and second border regions divided by the sum thereof, and responsive to said constant voltage outputs corresponding with electrical signals at said first and fourth border regions for deriving y-coordinate signals corresponding with the ratio of the difference of said constant voltage outputs corresponding with said third and fourth border regions divided by the sum thereof; and analog switching means including first discrete low impedance switches, each coupled between a selected one of said first contacts and said signal treating means voltage converter means input and actuable to effect conveyance of said electrical signals thereto, second discrete low impedance switches, each coupled between a selected one of said second contacts and said signal treating means voltage converter means input and actuable to effect conveyance of said electrical signals thereto, third discrete low impedance switches, each coupled between a selected one of said third contacts and said signal treating means voltage converter means input and actuable to effect conveyance of said electrical signals thereto, fourth discrete low impedance switches, each coupled between a selected one of said fourth contacts and said signal treating means voltage converter means input and actuable to effect conveyance of said electrical signals thereto, said switching means effecting a mutual open circuit isolation of said third and fourth contacts when said first and second switches are actuated and effecting a mutual, open circuit isolation of said first and second contacts when said third and fourth switches are actuated.

2. The system of claim 1 in which:
said substrate is substantially transparent; and
said resistive layer is a deposited oxide of metal selected from the group comprising tantalum, indium, tin, antimony and mixtures thereof.

3. The system of claim 1 in which more than seven said first and second contacts are provided within respective said first and second border regions.

4. The system of claim 3 in which more than seven said third and fourth contacts are provided within respective said third and fourth border regions.

5. The system of claim 1 in which said stylus means is a band manipular, self-contained, battery powered transmitting antenna operative in a frequency range of between about 10 KHz and 1 MHz.

6. The system of claim 1 in which the values of said low impedance of said first, second, third and fourth discrete switches are substantially below the value of said resistance of said resistive layer.

7. The method for generating coordinate signals in conjunction with a surface comprising the steps of:

providing a resistive surface of selected impedance value having an operational region extending in spaced apart x-coordinate sense between first and second spaced apart border regions having respective first and second spaced contacts thereon, and extending in a y-coordinate sense between third and fourth spaced apart border regions having respectivve third and fourth spaced apart contacts thereon;

transmitting localized electromagnetic radiation of predetermined frequency from an a.c. source to effect the propagation thereof toward a select coordinate identifiable location upon said resistive surface from positions selectively spaced therefrom to effect interaction with said layer;

providing first and second discrete low impedance switches coupled with respective said first and second contacts and actuable from off to on conditions to provide a low impedance transfer of radiation induced currents at said first and second border regions;

providing third and fourth discrete low impedance switches coupled with respective said third and fourth contacts and actuable from on to off conditions to provide a low impedance transfer of radiation induced currents at said third and fourth border regions;

actuating said first and second low impedance switches to an on condition while effecting a said third and fourth low impedance switches off condition to effect conveyance of said radiation induced currents from said first and second border regions;

converting said radiation induced currents conveyed by said first and second low impedance switches into respective first and second alternating voltage signals;

converting said first and second alternating voltage signals into respective first and second constant voltage levels proportional to said alternating voltage signal; and deriving x-coordinate signals as the ratio of the difference of said first and second constant voltage levels divided by the sum thereof.

8. The method of claim 7 including the steps of:
subsequently actuating said third and fourth low impedance switches to an on condition while effecting a said first and second low impedance switches off condition to effect conveyance of said radiation induced currents from said third and fourth border regions;

converting said radiation induced currents conveyed by said third and fourth low impedance switches into respective third and fourth alternating voltage signals;

converting said third and fourth alternating voltage signals into respective third and fourth constant voltage levels; and deriving y-coordinate signals as the ratio of the difference of said third and fourth constant voltage levels divided by the sum thereof.

* * * * *